US012540627B2

(12) United States Patent
Lin et al.

(10) Patent No.: US 12,540,627 B2
(45) Date of Patent: Feb. 3, 2026

(54) METHOD FOR SELECTING BOOSTER PUMP FOR CIRCUITING COOLING WATER OF BYPASS PIPING SYSTEM

(71) Applicant: HUANENG SHANTOU HAIMEN POWER GENERATION CO., LTD., Shantou (CN)

(72) Inventors: Songqing Lin, Shantou (CN); Chuangwei Zheng, Shantou (CN); Liang You, Shantou (CN); Hongjin Li, Shantou (CN); Yiming Shi, Shantou (CN); Shaohua Chen, Shangtou (CN); Jiongbin Zou, Shantou (CN); Zeqing Wu, Shantou (CN); Yuanlei Zhu, Shantou (CN); Junkai Xie, Shantou (CN); Xiaohui Huang, Shantou (CN); Xiaoqiang Zhang, Shantou (CN)

(73) Assignee: HUANENG SHANTOU HAIMEN POWER GENERATION CO., LTD., Santou (CN)

( * ) Notice: Subject to any disclaimer, the term of this patent is extended or adjusted under 35 U.S.C. 154(b) by 0 days.

(21) Appl. No.: 19/235,686

(22) Filed: Jun. 12, 2025

(65) Prior Publication Data

US 2026/0002544 A1 Jan. 1, 2026

(30) Foreign Application Priority Data

Jun. 28, 2024 (CN) .......................... 202410869260.6

(51) Int. Cl.
*F04D 27/00* (2006.01)
*F04B 49/06* (2006.01)

(52) U.S. Cl.
CPC .......... *F04D 27/001* (2013.01); *F04B 49/065* (2013.01)

(58) Field of Classification Search
CPC ........ F04D 27/00; F04D 27/001; F04B 9/065; F01D 17/145; F01D 17/18
See application file for complete search history.

(56) References Cited

U.S. PATENT DOCUMENTS

| 2012/0301320 A1* | 11/2012 | Seitter ................... F04D 13/10 417/1 |
| 2013/0289780 A1* | 10/2013 | McNamara ......... F24D 17/0078 700/282 |

FOREIGN PATENT DOCUMENTS

| CA | 3178759 A1 | 4/2023 |
| CN | 108194155 A | 6/2018 |

(Continued)

OTHER PUBLICATIONS

Mu Chunhua, Cheng Dongtao, Ju Wenping, Ma Tingshan, Analysis on Type Selection of Circulating Water Pump for Large Steam Turbines, Journal, May 2018, vol. 51, No. 5, Electric Power, China.

(Continued)

*Primary Examiner* — Nathaniel E Wiehe
*Assistant Examiner* — Maxime M Adjagbe
(74) *Attorney, Agent, or Firm* — Ming Jiang; OPENPTO US LLC

(57) ABSTRACT

A method for selecting a booster pump for circulating cooling water of a bypass piping system is provided in the disclosure, which includes: acquiring booster pump data of the booster pump for the circulating cooling water of the bypass piping system, and constructing and updating a database for selecting the booster pump for the circulating cooling water of the bypass piping system; performing primary booster pump selection according to final user's selection requirements and constructing a booster pump preselection set; calculating water resistance of the circulating cooling water in the bypass piping system, determining a selection score according to user's selection evaluation (Continued)

standard for performing secondary booster pump selection, and determining a finally selected booster pump for the circulating cooling water of the bypass piping system; and visually outputting and displaying performance parameters, performance curves and installation data graphs.

8 Claims, 2 Drawing Sheets

(56) References Cited

FOREIGN PATENT DOCUMENTS

| | | |
|---|---|---|
| CN | 110032155 A | 7/2019 |
| CN | 114033659 A | 2/2022 |
| KR | 101797015 B1 | 12/2017 |

OTHER PUBLICATIONS

Chen Jinhua, Fu Xuedong, Research on Capacity Calculation and Operation Logic of Black Start Diesel Gen-set for 2x300 MW, Journal, Jun. 2018, No. 2, Movable Power Station & Vehicle, China.
Hu Bo, Comparison of Industrial Cooling Water System Settings in Power Plants, Journal, Apr. 2001, No. 02, Sichuan Electric Power Technology, China.

* cited by examiner

METHOD FOR SELECTING BOOSTER PUMP FOR CIRCUITING COOLING WATER OF BYPASS PIPING SYSTEM

CROSS-REFERENCE TO RELATED APPLICATIONS

This application claims priority of Chinese Patent Application No. 202410869260.6, filed on Jun. 28, 2024, the contents of which are hereby incorporated by reference.

TECHNICAL FIELD

The disclosure relates to the technical field of energy saving of a cold end system of a steam turbine, in particular to a method for selecting a booster pump for circulating cooling water of a bypass piping system.

BACKGROUND

With development of thermal power generation technologies, steam turbines are widely used in power plants to drive motors. The steam turbines can directly convert heat energy into wind energy, which reduces energy consumption and thus improves operation efficiency of power generating units. The operation efficiency of the steam turbine is limited by a booster pump for circulating cooling water of a bypass piping system. When selection of the booster pump is not matched, flow of the circulating cooling water of the units decreases in actual operation, which thus results in increase in a back pressure of the steam turbine and decrease in operation efficiency, and seriously affects efficiency of thermal power generation.

Therefore, a method for selecting a booster pump for circulating cooling water of a bypass piping system is provided in the disclosure.

SUMMARY

A method for selecting a booster pump for circulating cooling water of a bypass piping system is provided in the disclosure so as to effectively ensure accurate selection of the booster pump for circulating cooling water of the bypass piping system by: acquiring booster pump data of the booster pump for the circulating cooling water of the bypass piping system, and constructing and updating a database for selecting the booster pump for the circulating cooling water of the bypass piping system; performing primary booster pump selection according to final user's selection requirements and constructing a booster pump preselection set; calculating water resistance of the circulating cooling water in the bypass piping system, determining a selection score according to user's selection evaluation standard for performing secondary booster pump selection, and determining a finally selected booster pump for the circulating cooling water of the bypass piping system; and visually outputting and displaying performance parameters, performance curves and installation data graphs.

A method for selecting a booster pump for circulating cooling water of a bypass piping system is provided in the disclosure, which includes:

step 1, acquiring booster pump data of the booster pump for the circulating cooling water of the bypass piping system, and constructing and updating a database for selecting the booster pump for the circulating cooling water of the bypass piping system, the booster pump data including design data for the booster pump, update data for the booster pump, and feedback data for the booster pump;

step 2, performing primary booster pump selection from the database for selecting the booster pump for the circulating cooling water of the bypass piping system according to final user's selection requirements, and constructing a booster pump preselection set;

step 3, calculating water resistance of the circulating cooling water in the bypass piping system for respective booster pumps for the circulating cooling water of the bypass piping system in the booster pump preselection set, determining respective selection scores according to user's selection evaluation standard for performing secondary booster pump selection, and determining a finally selected booster pump for the circulating cooling water of the bypass piping system; and step 4: visually outputting and displaying performance parameters, a performance curve and an installation data graph of the finally selected booster pump for the circulating cooling water of the bypass piping system.

According to the method for selecting the booster pump for circulating cooling water of the bypass piping system provided in the disclosure, the acquiring the booster pump data of the booster pump for the circulating cooling water of the bypass piping system and constructing and updating the database for selecting the booster pump for the circulating cooling water of the bypass piping system includes:

acquiring the booster pump data of the booster pump for the circulating cooling water of the bypass piping system according to standard parameter data of the booster pump, constructing the database for selecting the booster pump for the circulating cooling water of the bypass piping system and performing classification on the database according to types, sizes and performance of booster pumps for the circulating cooling water of the bypass piping system; and acquiring the update data for the booster pump and the feedback data for the booster pump of the booster pump for the circulating cooling water of the bypass piping system, and updating the database for selecting the booster pump for the circulating cooling water of the bypass piping system.

When a user selects the booster pump for the circulating cooling water of the bypass piping system, the final user's selection requirements are obtained and analyzed, and the database for selecting the booster pump for the circulating cooling water of the bypass piping system is combined and corresponding selection data is called.

According to the method for selecting the booster pump for circulating cooling water of the bypass piping system provided in the disclosure, the acquiring the update data for the booster pump and the feedback data for the booster pump of the booster pump for the circulating cooling water of the bypass piping system and updating the database for selecting the booster pump for the circulating cooling water of the bypass piping system includes:

acquiring update data of a booster pump manufacturer and modification data of a booster pump engineer according to a preset data updating strategy, and determining the update data for the booster pump of the booster pump for the circulating cooling water of the bypass piping system; and acquiring the feedback data for the booster pump of the booster pump for the circulating cooling water of the bypass piping system according to feedback data from a user of the booster pump, and updating the database for selecting the booster pump for the circulating cooling water of the bypass piping system.

The method for selecting the booster pump for circulating cooling water of the bypass piping system provided in the disclosure further includes:

performing data normalization on the update data according to a standard data format when it is monitored that there is data updating in the database for selecting the booster pump for the circulating cooling water of the bypass piping system, and performing data updating once the data normalization is completed;

enabling the user to input the final user's selection requirements for data screening when it is monitored that there is user access to the database for selecting the booster pump for the circulating cooling water of the bypass piping system; and automatically monitoring the data updating and reminding the user to perform the data updating when it is monitored that there is data updating for the booster pump for the circulating cooling water of the bypass piping system selected by the user.

According to the method for selecting the booster pump for circulating cooling water of the bypass piping system provided in the disclosure, the performing the primary booster pump selection from the database for selecting the booster pump for the circulating cooling water of the bypass piping system according to the final user's selection requirements and constructing the booster pump preselection set includes:

presetting selection input options in selecting the booster pump for the circulating cooling water of the bypass piping system by the user, and performing primary quantization for determining user's selection requirements, the selection input options including a type, a desired flow, a desired head, desired efficiency, desired power, and desired performance of the booster pump for the circulating cooling water of the bypass piping system, and water resistance of the circulating cooling water of the bypass piping system;

providing installation data graphs and size range options of the booster pump for the circulating cooling water of the bypass piping system that conform to the selection input options once the user completes the selection input options, and performing secondary quantization for determining user's selection requirements;

determining the final user's selection requirements according to the user's selection requirements determined by the primary quantification and the user's selection requirements determined by the secondary quantification; and performing the primary booster pump selection from the database for selecting the booster pump for the circulating cooling water of the bypass piping system according to the final user's selection requirements, and constructing the booster pump preselection set.

The method for selecting the booster pump for circulating cooling water of the bypass piping system provided in the disclosure further includes:

performing a selection simulation test on the primary booster pump selection according to a preset test strategy and determining that the primary booster pump selection is capable of being performed in a case where efficiency for the primary booster pump selection and accuracy for the primary booster pump selection are monitored to meet a test standard; and adjusting and optimizing a selection range according to the efficiency for the primary type selection and the accuracy for the primary booster pump selection in a case where efficiency for the primary booster pump selection and accuracy for the primary booster pump selection are monitored to not meet the test standard.

The preset test strategy includes an automatic periodic cycle simulation test strategy and a manual random simulation test strategy.

According to the method for selecting the booster pump for circulating cooling water of the bypass piping system provided in the disclosure, the calculating the water resistance of the circulating cooling water in the bypass piping system for the respective booster pumps for the circulating cooling water of the bypass piping system in the booster pump preselection set, determining the respective selection scores according to the user's selection evaluation standard for performing the secondary booster pump selection, and determining the finally selected booster pump for the circulating cooling water of the bypass piping system includes:

classifying the water resistance of the circulating cooling water of the bypass piping system into structural water resistance according to a structure of the booster pump for the circulating cooling water of the bypass piping system, the structural water resistance including water resistance from a pipeline, water resistance from a secondary filter and water resistance from a condenser;

acquiring normal-operation structural water resistance of the respective booster pumps for the circulating cooling water of the bypass piping system in the booster pump preselection set in normal operation and full-load-operation structural water resistance in full-load operation;

connecting the pipeline, the secondary filter and the condense in the bypass piping system in series, and calculating the water resistance of the circulating cooling water in the bypass piping system for the respective booster pumps for the circulating cooling water of the bypass piping system in the booster pump preselection set according to hydraulic calculation characteristics of a series connected piping as follows;

$$\begin{cases} H1 = (S1Q1^2 + H1 + H2) \cdot \lambda \frac{L1}{d1} \frac{v1^2}{2\,g} \\ H2 = \left( S1Q2^2 + H3 + \frac{L1}{n1} \sum_{i1=1}^{n1} \left( a1 \frac{vi1}{di1} \right) + \sum_{i1=1}^{n1} Ri1 \right) \cdot \lambda \frac{L1}{d1} \frac{v1^2}{2\,g} \end{cases};$$

in which H1 indicates water resistance of the circulating cooling water in the bypass piping system for the booster pump for the circulating cooling water of the bypass piping system in normal operation; H2 indicates water resistance of the circulating cooling water in the bypass piping system for the booster pump for the circulating cooling water of the bypass piping system in full-load operation; S1 indicates resistance of a bypass piping; Q1 indicates a normal-operation flow of the circulating cooling water in the bypass piping system in normal operation; H1 indicates water resistance from the secondary filter of the circulating cooling water in the bypass piping system in normal operation; H2 indicates water resistance from the condenser of the circulating cooling water in the bypass piping system in normal operation; λ indicates a frictional resistance coefficient of the circulating cooling water in the bypass piping system; L1 indicates a total pipeline length of the bypass piping system; d1 indicates an average pipeline diameter of the bypass pipe system; v1 indicates a flow rate of the circulating cooling water in the bypass piping system; g indicates an acceleration of gravity; Q2 indicates a full-load-operation flow of the circulating cooling water in the bypass piping system in full-load operation; H3 indicates water resistance from the secondary filter of the circulating cooling water in the bypass piping system in full-load operation; a1 indicates a correction coefficient of the circulating cooling water in the bypass piping system in full-load operation; vi1 indicates a full-load flow rate of the circulating cooling water in an i1-th section of pipeline in the bypass piping system; di1 indicates a pipeline diameter of the i1-th section of pipeline in the bypass piping system; Ri1 indicates full-load water resistance of the circulating cooling water in the i1-th section of pipeline in the bypass piping system; n1 indicates a number of segments of pipelines in the bypass piping system;

determining a head of the booster pump for the circulating cooling water in the bypass piping system according to the water resistance of the circulating cooling water in the bypass piping system, and acquiring the user's selection evaluation standard in a case where flow-heads of the booster pumps for the circulating cooling water of the bypass piping system in the booster pump preselection set at a desired operation point are within a preset efficiency range;

calling a standard selection evaluation standard if there is no user's selection evaluation standard; and weighting a flow, a head, power and efficiency according to the user's selection evaluation criteria/the standard selection evaluation criteria for determining the respective selection scores for performing the secondary booster pump selection, and determining the finally selected booster pump for the circulating cooling water of the bypass piping system.

According to the method for selecting the booster pump for circulating cooling water of the bypass piping system provided in the disclosure, the visually outputting and displaying the performance parameters, the performance curve and the installation data graph of the finally selected booster pump for the circulating cooling water of the bypass piping system includes:

acquiring the performance parameters of the finally selected booster pump for the circulating cooling water of the bypass piping system, determining a flow-head change curve and a flow-power change curve, performing curve fitting on the flow-head change curve and the flow-power change curve according to a preset curve processing strategy, and determining a performance curve of the finally selected booster pump for the circulating cooling water of the bypass piping system;

accessing an installation data graph database to determine the installation data map of the finally selected booster pump for the circulating cooling water of the bypass piping system;

acquiring a user data format once the user defines a data format, and calling the installation data map of the finally selected booster pump for the circulating cooling water of the bypass piping system and performing data format conversion; and visually outputting and displaying the performance parameters, the performance curve and the installation data graph.

Compared with related art, the disclosure has following beneficial effects.

By acquiring the booster pump data of the booster pump for the circulating cooling water of the bypass piping system, and constructing and updating the database for selecting the booster pump for the circulating cooling water of the bypass piping system; performing the primary booster pump selection according to the final user's selection requirements and constructing the booster pump preselection set; calculating the water resistance of the circulating cooling water in the bypass piping system, determining the selection score according to user's selection evaluation standard for performing secondary booster pump selection, and determining the finally selected booster pump for the circulating cooling water of the bypass piping system; and visually outputting and displaying the performance parameters, the performance curve and the installation data graph, accurate selection of the booster pump for the circulating cooling water of the bypass piping system can be effectively ensured.

Other features and advantages of the disclosure will be set forth in following description, and in part will be obvious from the description, or may be learned by implementation of the disclosure. Objects and other advantages of the present disclosure may be realized and obtained by the structure particularly proposed in the written specification as well as the drawings.

Technical schemes of this disclosure will be described in further detail through the drawings and embodiments.

BRIEF DESCRIPTION OF THE DRAWINGS

In order to explain technical schemes in the disclosure and in related art more clearly, the drawings required in the description of the embodiments or the related art will be briefly introduced below; obviously, the drawings in the following description are some of embodiments of the present disclosure, and other drawings can be obtained according to these drawings by those of ordinary skilled in the art without paying creative labor.

DETAILED DESCRIPTION OF THE EMBODIMENTS

In order to make the purposes, technical schemes and advantages of this disclosure more clear, the technical schemes in this disclosure will be described clearly and completely with reference to the drawings in this disclosure; and it is obvious that the described embodiments are part of the embodiments of this disclosure, but not all of them. On a basis of the embodiments in this disclosure, all other embodiments obtained by the ordinary skilled in the art without any creative effort are within the protection scope of this disclosure.

Embodiment 1

Figure 1:
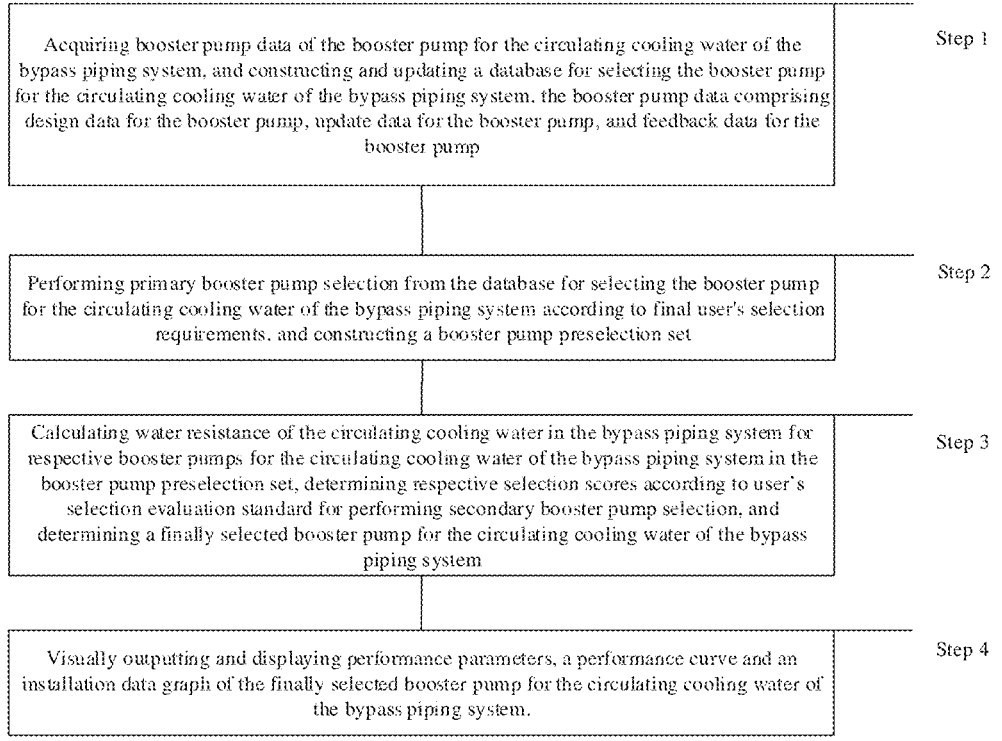
FIG. 1 is a schematic flow chart of a method for selecting a booster pump for circulating cooling water of a bypass piping system provided in an embodiment of the present disclosure.

As shown in FIG. 1, a method for selecting a booster pump for circulating cooling water of a bypass piping system is provided in an embodiment of the present disclosure, which mainly includes:

step 1, acquiring booster pump data of the booster pump for the circulating cooling water of the bypass piping system, and constructing and updating a database for selecting the booster pump for the circulating cooling water of the bypass piping system, the booster pump data including design data for the booster pump, update data for the booster pump, and feedback data for the booster pump;

step 2, performing primary booster pump selection from the database for selecting the booster pump for the circulating cooling water of the bypass piping system according to final user's selection requirements, and constructing a booster pump preselection set;

step 3, calculating water resistance of the circulating cooling water in the bypass piping system for respective booster pumps for the circulating cooling water of the bypass piping system in the booster pump preselection set, determining respective selection scores according to user's selection evaluation standard for performing secondary booster pump selection, and determining a finally selected booster pump for the circulating cooling water of the bypass piping system; and step 4: visually outputting and displaying performance parameters, a performance curve and an installation data graph of the finally selected booster pump for the circulating cooling water of the bypass piping system.

In this embodiment, the design data for the booster pump and the update data for the booster pump are acquired from a booster pump manufacturer or a booster pump engineer. The design data for the booster pump includes: size data, type data and performance data (flow, head, power and efficiency) for the booster pump.

In this embodiment, the feedback data for the booster pump is acquired from a user of the booster pump, and is configured to optimize and update a respective booster pump for the circulating cooling water of the bypass piping system.

In this embodiment, the final user's selection requirements can be for example that the user selects booster pumps for the circulating cooling water of the bypass piping system of a type a1, a size in a range b1, and performance not lower than c1.

In this embodiment, the performing the primary booster pump selection from the database for selecting the booster pump for the circulating cooling water of the bypass piping system according to the final user's selection requirements refers to preliminary selection of booster pumps for the circulating cooling water of the bypass piping system to determine booster pumps for the circulating cooling water of the bypass piping system that meet the final user's selection requirements. For example, the primary booster pump selection is performed to determine a booster pump d1 for the circulating cooling water of the bypass piping system, a booster pump d2 for the circulating cooling water of the bypass piping system, and a booster pump d3 for the circulating cooling water of the bypass piping system.

In this embodiment, the booster pump preselection set refers to a set constructed of results of the primary booster pump selection, for example, the booster pumps d1, d2 and d3 for the circulating cooling water of the bypass piping system.

In this embodiment, the user's selection evaluation standard can be for example that user's selection focuses on the power of the booster pump for the circulating cooling water of the bypass piping system.

In this embodiment, the selection scores are for quantifying the booster pump for the circulating cooling water of the bypass piping system, which facilitates selection by the user.

In this embodiment, the determining respective selection scores according to the user's selection evaluation standard is used to determine the finally selected booster pump for the circulating cooling water of the bypass piping system. For example, the booster pump d1 for the circulating cooling water of the bypass piping system is determined from the booster pumps d1, d2 and d3 for the circulating cooling water of the bypass piping system as the finally selected booster pump for the circulating cooling water of the bypass piping system.

Technical schemes has beneficial effects that: by acquiring the booster pump data of the booster pump for the circulating cooling water of the bypass piping system, and constructing and updating the database for selecting the booster pump for the circulating cooling water of the bypass piping system; performing the primary booster pump selection according to the final user's selection requirements and constructing the booster pump preselection set; calculating the water resistance of the circulating cooling water in the bypass piping system, determining the selection score according to user's selection evaluation standard for performing secondary booster pump selection, and determining the finally selected booster pump for the circulating cooling water of the bypass piping system; and visually outputting and displaying the performance parameters, the performance curve and installation data graph, accurate selection of the booster pump for the circulating cooling water of the bypass piping system can be effectively ensured.

Embodiment 2

In the method for selecting the booster pump for the circulating cooling water of the bypass piping system, the acquiring the booster pump data of the booster pump for the circulating cooling water of the bypass piping system and constructing and updating the database for selecting the booster pump for the circulating cooling water of the bypass piping system includes:

acquiring the booster pump data of the booster pump for the circulating cooling water of the bypass piping system according to standard parameter data of the booster pump, constructing the database for selecting the booster pump for the circulating cooling water of the bypass piping system and performing classification on the database according to types, sizes and performance of booster pumps for the circulating cooling water of the bypass piping system; and acquiring the update data for the booster pump and the feedback data for the booster pump of the booster pump for the circulating cooling water of the bypass piping system, and updating the database for selecting the booster pump for the circulating cooling water of the bypass piping system.

When a user selects the booster pump for the circulating cooling water of the bypass piping system, the final user's selection requirements are obtained and analyzed, and the database for selecting the booster pump for the circulating cooling water of the bypass piping system is combined and corresponding selection data is called.

In this embodiment, the standard parameter data of the booster pump are acquired according to drawings of booster pumps for circulating cooling water of the bypass piping system, a manufacturer, or a booster pump engineer, for example standard size parameter data, standard operation performance parameter data and standard type parameter data.

In this embodiment, a number of classifications on the database is determined according to a type, a size and performance of the booster pump for the circulating cooling water of the bypass piping system.

In this embodiment, booster pump data of one booster pump for the circulating cooling water of the bypass piping system can be stored in multiple databases for the booster pump for the circulating cooling water of the bypass piping system. For example, booster pump data of the booster pump a1 for the circulating cooling water of the bypass piping system is stored in a database for a booster pump for the circulating cooling water of the bypass piping system of a type b1 and in a database for a booster pump for the circulating cooling water of the bypass piping system of performance c1.

The technical scheme above has beneficial effects that by acquiring the booster pump data of the booster pump for the circulating cooling water of the bypass piping system and constructing and updating the database for selecting the booster pump for the circulating cooling water of the bypass piping system, subsequent accurate selection by the user can be facilitated, which lays foundation for selection.

Embodiment 3

In the method for selecting the booster pump for the circulating cooling water of the bypass piping system, the acquiring the update data for the booster pump and the feedback data for the booster pump of the booster pump for the circulating cooling water of the bypass piping system and updating the database for selecting the booster pump for the circulating cooling water of the bypass piping system includes:
  acquiring update data of a booster pump manufacturer and modification data of a booster pump engineer according to a preset data updating strategy, and determining the update data for the booster pump of the booster pump for the circulating cooling water of the bypass piping system; and
  acquiring the feedback data for the booster pump of the booster pump for the circulating cooling water of the bypass piping system according to feedback data from a user of the booster pump, and updating the database for selecting the booster pump for the circulating cooling water of the bypass piping system.

In this embodiment, the preset data update strategy includes a strategy of periodically detecting data for data updating and a strategy of updating data on-the-fly. According to selection for updating data, for example, daily data updating, the data updating is performed according to the strategy of periodically detecting data for data updating.

In this embodiment, data correctness of the update data of the booster pump manufacturer and the modification data of the booster pump engineer are detected, and when the data is detected to be with error, the data update is not performed and this erroneous data update is recorded.

In this embodiment, the feedback data from the user of the booster pump is used to assist in data updating by the booster pump manufacturer/the booster pump engineer.

The technical scheme above has beneficial effects that: by acquiring the update data for the booster pump and the feedback data for the booster pump of the booster pump for the circulating cooling water of the bypass piping system and updating the database for selecting the booster pump for the circulating cooling water of the bypass piping system, data validity of the booster pump for the circulating cooling water of the bypass piping system is ensured.

Embodiment 4

The method for selecting the booster pump for the circulating cooling water of the bypass piping system further includes:
  performing data normalization on the update data according to a standard data format when it is monitored that there is data updating in the database for selecting the booster pump for the circulating cooling water of the bypass piping system, and performing data updating once the data normalization is completed;
  enabling the user to input the final user's selection requirements for data screening when it is monitored that there is user access to the database for selecting the booster pump for the circulating cooling water of the bypass piping system; and
  automatically monitoring the data updating and reminding the user to perform the data updating when it is monitored that there is data updating for the booster pump for the circulating cooling water of the bypass piping system selected by the user.

In this embodiment, the standard data format refers to a format in which data stored in the database for the booster pump for the circulating cooling water of the bypass piping system. For example, the type data of the booster pump for the circulating cooling water of the bypass piping system is stored in a format a1.

In this embodiment, the data normalization is performed on the update data according to the standard data format, so as to ensure consistency of data formats and avoid influence of format problems on a user's selection operation.

In this embodiment, when it is monitored that there is user access to the database for selecting the booster pump for the circulating cooling water of the bypass piping system, the user is enabled to input the final user's selection requirements for data screening. For example, when the user selects the booster pump, following screening options are popped up: a type screening option, a size screening option and a performance screening option.

The technical scheme above has beneficial effects that: through the data normalization, it is convenient for users to carry out the selection operation; and by automatically monitoring the data updating and reminding the user to perform the data updating, It is beneficial to ensure normal operations of the booster pump for the circulating cooling water of the bypass piping system and subsequent correct selection.

Embodiment 5

In the method for selecting the booster pump for the circulating cooling water of the bypass piping system, the performing the primary booster pump selection from the database for selecting the booster pump for the circulating cooling water of the bypass piping system according to the final user's selection requirements and constructing the booster pump preselection set includes:
  presetting selection input options in selecting the booster pump for the circulating cooling water of the bypass piping system by the user, and performing primary quantization for determining user's selection requirements, the selection input options including a type, a desired flow, a desired head, desired efficiency, desired power, and desired performance of the booster pump for the circulating cooling water of the bypass piping system, and water resistance of the circulating cooling water of the bypass piping system;

providing installation data graphs and size range options of the booster pump for the circulating cooling water of the bypass piping system that conform to the selection input options once the user completes the selection input options, and performing secondary quantization for determining user's selection requirements;

determining the final user's selection requirements according to the user's selection requirements determined by the primary quantification and the user's selection requirements determined by the secondary quantification; and performing the primary booster pump selection from the database for selecting the booster pump for the circulating cooling water of the bypass piping system according to the final user's selection requirements, and constructing the booster pump preselection set.

In this embodiment, the performing the primary quantization for determining user's selection requirements means that the user fills in specific selection input options, such as a desired flow a1 and a type b1 of the booster pump for the circulating cooling water of the bypass piping system.

In this embodiment, the performing the primary quantization for determining user's selection requirements is for accurately determining the user's selection requirements, and it is used when the user's selection requirements are clear.

In this embodiment, installation data graphs and size range options of the booster pump for the circulating cooling water of the bypass piping system that conform to the selection input options are provided and the secondary quantization is performed for determining user's selection requirements. For example, if a size is not determined in the performing the primary quantification for determining user's selection requirements, a size range c1 in user's selection is determined by the secondary quantification.

In this embodiment, the performing the secondary quantization for determining user's selection requirements is for fuzzy determination of the user's selection requirements, and it is used when the user's selection requirements are fuzzy.

The technical scheme above has beneficial effects that: by performing the primary booster pump selection from the database for selecting the booster pump for the circulating cooling water of the bypass piping system according to the final user's selection requirements and constructing the booster pump preselection set, user's selection efficiency for selecting the booster pump for the circulating cooling water of the bypass piping system is improved.

Embodiment 6

The method for selecting the booster pump for the circulating cooling water of the bypass piping system further includes:

performing a selection simulation test on the primary booster pump selection according to a preset test strategy and determining that the primary booster pump selection is capable of being performed in a case where efficiency for the primary booster pump selection and accuracy for the primary booster pump selection are monitored to meet a test standard; and adjusting and optimizing a selection range according to the efficiency for the primary type selection and the accuracy for the primary booster pump selection in a case where efficiency for the primary booster pump selection and accuracy for the primary booster pump selection are monitored to not meet the test standard.

The preset test strategy includes an automatic periodic cycle simulation test strategy and a manual random simulation test strategy.

In this embodiment, the performing the selection simulation test on the primary booster pump selection refers to simulation of generation of the user's selection requirements and selection simulation, and performing a simulation test for the primary booster pump selection. For example, a user's selection requirement a1 is generated by simulation, which corresponds to selection of a booster pump b1 for the circulating cooling water of the bypass piping system, and the primary booster pump selection is performed according to the simulation generated user's selection requirements a1.

In this embodiment, the efficiency for the primary booster pump selection is determined according to a duration of the primary booster pump selection. For example, if a duration t1 of the primary booster pump selection is lower than a preset duration t2 for booster pump selection, the efficiency for the primary booster pump selection meets a test standard.

The technical scheme above has beneficial effects that: by performing the selection simulation test on the primary selection for the booster pump for the circulating cooling water of the bypass piping system according to the preset test strategy, data accuracy of the booster pump for the circulating cooling water of the bypass piping system in a result of the primary selection is ensured.

Embodiment 7

In the method for selecting the booster pump for circulating cooling water of the bypass piping system, the calculating the water resistance of the circulating cooling water in the bypass piping system for the respective booster pumps for the circulating cooling water of the bypass piping system in the booster pump preselection set, determining the respective selection scores according to the user's selection evaluation standard for performing the secondary booster pump selection, and determining the finally selected booster pump for the circulating cooling water of the bypass piping system includes:

classifying the water resistance of the circulating cooling water of the bypass piping system into structural water resistance according to a structure of the booster pump for the circulating cooling water of the bypass piping system, the structural water resistance including water resistance from a pipeline, water resistance from a secondary filter and water resistance from a condenser;

acquiring normal-operation structural water resistance of the respective booster pumps for the circulating cooling water of the bypass piping system in the booster pump preselection set in normal operation and full-load-operation structural water resistance in full load operation;

connecting the pipeline, the secondary filter and the condense in the bypass piping system in series, and calculating the water resistance of the circulating cooling water in the bypass piping system for the respective booster pumps for the circulating cooling water of the bypass piping system in the booster pump preselection set according to hydraulic calculation characteristics of a series connected piping as follows;

$$\begin{cases} H1 = (S1Q1^2 + H1 + H2) \cdot \lambda \frac{L1}{d1} \frac{v1^2}{2g} \\ H2 = \left(S1Q2^2 + H3 + \frac{L1}{n1}\sum_{i1=1}^{n1}\left(a1\frac{vi1}{di1}\right) + \sum_{i1=1}^{n1} Ri1\right) \cdot \lambda \frac{L1}{d1} \frac{v1^2}{2g} \end{cases} ;$$

in which H1 indicates water resistance of the circulating cooling water in the bypass piping system for the booster pump for the circulating cooling water of the bypass piping system in normal operation; H2 indicates water resistance of the circulating cooling water in the bypass piping system for the booster pump for the circulating cooling water of the bypass piping system in full-load operation; S1 indicates resistance of a bypass piping; Q1 indicates a normal-operation flow of the circulating cooling water in the bypass piping system in normal operation; H1 indicates water resistance from the secondary filter of the circulating cooling water in the bypass piping system in normal operation; H2 indicates water resistance from the condenser of the circulating cooling water in the bypass piping system in normal operation; λ indicates a frictional resistance coefficient of the circulating cooling water in the bypass piping system; L1 indicates a total pipeline length of the bypass piping system; d1 indicates an average pipeline diameter of the bypass pipe system; v1 indicates a flow rate of the circulating cooling water in the bypass piping system; g indicates an acceleration of gravity; Q2 indicates a full-load-operation flow of the circulating cooling water in the bypass piping system in full-load operation; H3 indicates water resistance from the secondary filter of the circulating cooling water in the bypass piping system in full-load operation; a1 indicates a correction coefficient of the circulating cooling water in the bypass piping system in full-load operation; vi1 indicates a full-load flow rate of the circulating cooling water in an i1-th section of pipeline in the bypass piping system; di1 indicates a pipeline diameter of the i1-th section of pipeline in the bypass piping system; Ri1 indicates full-load water resistance of the circulating cooling water in the i1-th section of pipeline in the bypass piping system; n1 indicates a number of segments of pipelines in the bypass piping system;

determining a head of the booster pump for the circulating cooling water in the bypass piping system according to the water resistance of the circulating cooling water in the bypass piping system, and acquiring the user's selection evaluation standard in a case where flow-heads of the booster pumps for the circulating cooling water of the bypass piping system in the booster pump preselection set at a desired operation point are within a preset efficiency range;
  calling a standard selection evaluation standard if there is no user's selection evaluation standard; and
  weighting a flow, a head, power and efficiency according to the user's selection evaluation criteria/the standard selection evaluation criteria for determining the respective selection scores for performing the secondary booster pump selection, and determining the finally selected booster pump for the circulating cooling water of the bypass piping system.

In this embodiment, the classifying the water resistance of the circulating cooling water of the bypass piping system into the structural water resistance according to the structure of the circulating cooling water of the bypass piping system facilitates accurate quantization and analysis of respective structural water resistance, thus accurately determining the water resistance of the circulating cooling water of the bypass piping system.

In this embodiment, the water resistance of the circulating cooling water of the bypass piping system is different in a different structure.

In this embodiment, the acquiring the normal-operation structural water resistance of the respective booster pumps for the circulating cooling water of the bypass piping system in the booster pump preselection set in normal operation and full-load-operation structural water resistance in full-load operation are for determining the head of the booster pump for the circulating cooling water of the bypass piping system.

In this embodiment, the desired operation point refers to an operation point with optimal operation parameters of the booster pump for the circulating cooling water of the bypass piping system. For example, when the booster pump for the circulating cooling water of the bypass piping system is with a flow q1 and a head h1, the booster pump for the circulating cooling water of the bypass piping system is with highest operation efficiency, and thus an operation point corresponding to the flow q1 and head h1 is determined as the desired operation point.

In this embodiment, the flow, the head, the power and the efficiency are weighted according to the user's selection evaluation criteria/the standard selection evaluation criteria, for example with a flow weight a1, a head weight a2, a power weight a3 and an efficiency weight a4, and with a total weight of 1.

In this embodiment, the flow, the head, the power and the efficiency are weighted according to the user's selection evaluation criteria/the standard selection evaluation criteria for determining the respective selection scores for performing the secondary booster pump selection, and the finally selected booster pump for the circulating cooling water of the bypass piping system is determined. For example, a booster pump b1 for the circulating cooling water of the bypass piping system in the booster pump preselection set is with a selection score c1, a booster pump b2 is with a selection score c2, and a booster pump b3 is with a selection score c3, in which the selection score c3 is highest, and thus the corresponding booster pump b3 is the finally selected booster pump for the circulating cooling water of the bypass piping system.

The technical scheme above has beneficial effects that by calculating the water resistance of the circulating cooling water in the bypass piping system for the respective booster pumps for the circulating cooling water of the bypass piping system in the booster pump preselection set and determining the respective selection scores according to the user's selection evaluation standard for performing the secondary booster pump selection, accurate selection of the booster pump for the circulating cooling water of the bypass piping system is effectively ensured.

Embodiment 8

In the method for selecting the booster pump for circulating cooling water of the bypass piping system provided in the disclosure, the visually outputting and displaying the performance parameters, the performance curve and the installation data graph of the finally selected booster pump for the circulating cooling water of the bypass piping system includes:

acquiring the performance parameters of the finally selected booster pump for the circulating cooling water of the bypass piping system, determining a flow-head change curve and a flow-power change curve, performing curve fitting on the flow-head change curve and the flow-power change curve according to a preset curve processing strategy, and determining a performance curve of the finally selected booster pump for the circulating cooling water of the bypass piping system;

accessing an installation data graph database to determine the installation data map of the finally selected booster pump for the circulating cooling water of the bypass piping system;

acquiring a user data format once the user defines a data format, and calling the installation data map of the finally selected booster pump for the circulating cooling water of the bypass piping system and performing data format conversion; and visually outputting and displaying the performance parameters, the performance curve and the installation data graph.

In this embodiment, curve fitting is performed on the flow-head change curve and the flow-power change curve according to the preset curve processing strategy. For example, the curve fitting is performed in a least square method.

In this embodiment, the installation data graph database is used to combine basic graphs to determine the installation data map of the finally selected booster pump for the circulating cooling water of the bypass piping system, so as to optimize generation efficiency of the installation data graph.

In this embodiment, the user-defined data format is only used for data format conversion when the data is presented to the user, and does not affect the data format in the database for the booster pump for the circulating cooling water of the bypass piping system. For example, if the user defines a data format a1, data format conversion is performed on data of the finally selected booster pump for the circulating cooling water of the bypass piping system.

The technical scheme above has beneficial effects that: the visually outputting and displaying the performance parameters, the performance curve and the installation data graph of the finally selected booster pump for the circulating cooling water of the bypass piping system facilitates users to intuitively know the finally selected booster pump for the circulating cooling water of the bypass piping system, so as to ensure accurate selection.

Figure 2:
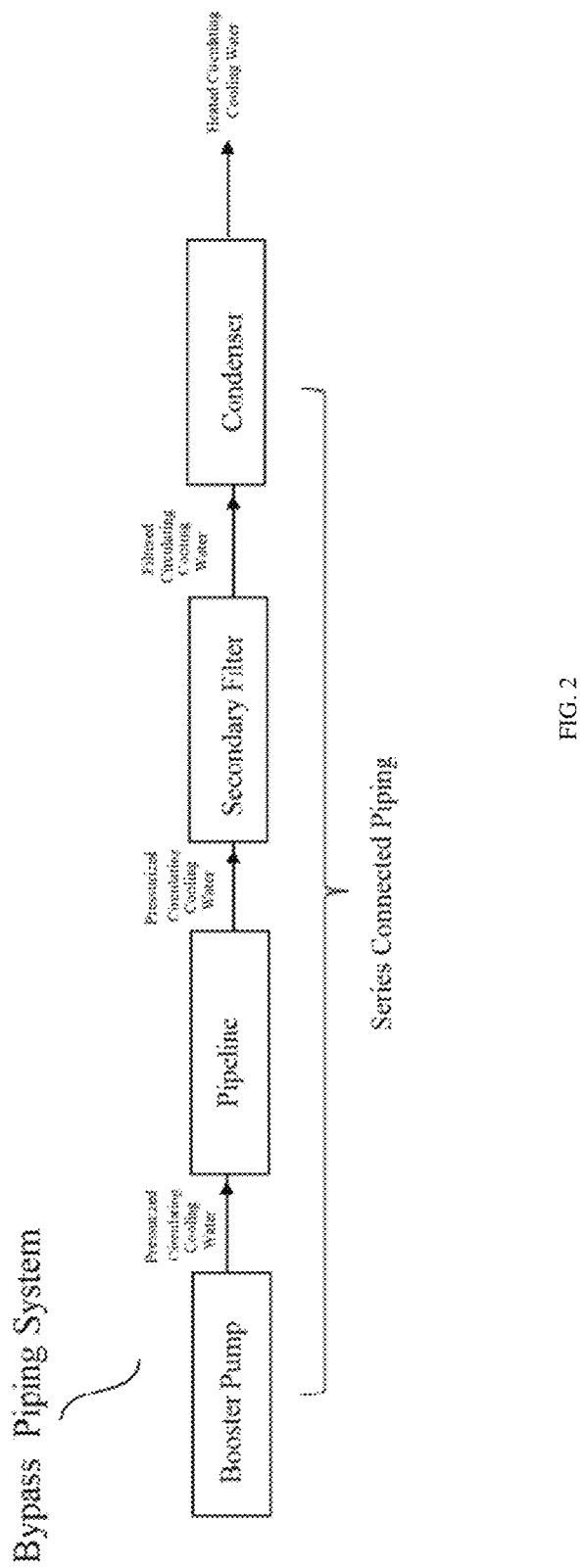
FIG. 2 illustrates an exemplary bypass piping system according to an embodiment of the present disclosure.

To facilitate understanding of the various embodiments described above, FIG. 2 illustrates an exemplary bypass piping system according to an embodiment of the present disclosure. As shown in FIG. 2, the bypass piping system provides a fluid flow path in which a booster pump, a pipeline, a secondary filter, and a condenser are connected in series. Pressurized circulating cooling water flows sequentially from the booster pump through the pipeline, then through the secondary filter where it becomes filtered circulating cooling water, and finally through the condenser where thermal exchange occurs, resulting in heated circulating cooling water exiting the system. The arrangement demonstrates the series connected piping configuration of the bypass piping system.

Finally, it should be noted that the above embodiments are only intended to illustrate, but not to limit, the technical schemes of the present disclosure. Although the present disclosure is described in detail with reference to the above embodiments, it can be understood by those skilled in the art that modifications still can be made to the technical schemes described in the embodiments, or replacements with equivalents can be made to a part of technical features thereof. These modifications or replacements do not make essence of respective technical solutions deviate from the spirit and scope of the technical schemes of various embodiments of the present disclosure.

What is claimed is:

1. A method for selecting a booster pump for circulating cooling water of a bypass piping system, wherein the bypass piping system comprises a pipeline, a secondary filter, and a condenser connected in series to form a fluid flow path, comprising:

step 1, acquiring booster pump data of the booster pump for the circulating cooling water of the bypass piping system, and constructing and updating a database for selecting the booster pump for the circulating cooling water of the bypass piping system, the booster pump data comprising design data for the booster pump, update data for the booster pump, and feedback data for the booster pump;

step 2, performing primary booster pump selection from the database for selecting the booster pump for the circulating cooling water of the bypass piping system according to final user's selection requirements, and constructing a booster pump preselection set;

step 3, calculating water resistance of the circulating cooling water in the bypass piping system for respective booster pumps in the booster pump preselection set, determining respective selection scores according to user's selection evaluation standard for performing secondary booster pump selection, and determining a finally selected booster pump for the circulating cooling water of the bypass piping system, comprising:

classifying the water resistance of the circulating cooling water of the bypass piping system into structural water resistance according to a structure of the booster pump for the circulating cooling water of the bypass piping system, the structural water resistance comprising water resistance from the pipeline, water resistance from the secondary filter and water resistance from the condenser;

acquiring normal-operation structural water resistance of the respective booster pumps in the booster pump preselection set in normal operation and full-load-operation structural water resistance in full-load operation;

calculating the water resistance of the circulating cooling water in the bypass piping system for the respective booster pumps in the booster pump preselection set according to hydraulic calculation characteristics of a series connected piping;

determining a head of the booster pump for the circulating cooling water in the bypass piping system according to the water resistance of the circulating cooling water in the bypass piping system, and acquiring the user's selection evaluation standard in a case where flow-heads of the booster pumps in the booster pump preselection set at a desired operation point are within a preset efficiency range;

calling a standard selection evaluation standard if there is no user's selection evaluation standard; and weighting a flow, a head, power and efficiency according to the user's selection evaluation criteria/the standard selection evaluation criteria for determining the respective selection scores for performing the secondary booster pump selection, and determining the finally selected booster pump for the circulating cooling water of the bypass piping system; and step 4: visually outputting and displaying performance parameters, a performance curve and an installation data graph of the finally selected booster pump for the circulating cooling water of the bypass piping system.

2. The method for selecting the booster pump for the circulating cooling water of the bypass piping system according to claim 1, wherein the acquiring the booster pump data of the booster pump for the circulating cooling water of the bypass piping system and constructing and updating the database for selecting the booster pump for the circulating cooling water of the bypass piping system comprises:
  acquiring the booster pump data of the booster pump for the circulating cooling water of the bypass piping system according to standard parameter data of the booster pump, constructing the database for selecting the booster pump for the circulating cooling water of the bypass piping system and performing classification on the database according to types, sizes and performance of booster pumps for the circulating cooling water of the bypass piping system; and
  acquiring the update data for the booster pump and the feedback data for the booster pump of the booster pump for the circulating cooling water of the bypass piping system, and updating the database for selecting the booster pump for the circulating cooling water of the bypass piping system; and
  when a user selects the booster pump for the circulating cooling water of the bypass piping system, the final user's selection requirements are obtained and analyzed, and the database for selecting the booster pump for the circulating cooling water of the bypass piping system is combined and corresponding selection data is called.

3. The method for selecting the booster pump for the circulating cooling water of the bypass piping system according to claim 2, wherein the acquiring the update data for the booster pump and the feedback data for the booster pump of the booster pump for the circulating cooling water of the bypass piping system and updating the database for selecting the booster pump for the circulating cooling water of the bypass piping system comprises:
  acquiring update data of a booster pump manufacturer and modification data of a booster pump engineer according to a preset data updating strategy, and determining the update data for the booster pump of the booster pump for the circulating cooling water of the bypass piping system; and
  acquiring the feedback data for the booster pump of the booster pump for the circulating cooling water of the bypass piping system according to feedback data from a user of the booster pump, and updating the database for selecting the booster pump for the circulating cooling water of the bypass piping system.

4. The method for selecting the booster pump for the circulating cooling water of the bypass piping system according to claim 3, further comprising:
  performing data normalization on the update data according to a standard data format when it is monitored that there is data updating in the database for selecting the booster pump for the circulating cooling water of the bypass piping system, and performing data updating once the data normalization is completed;
  enabling the user to input the final user's selection requirements for data screening when it is monitored that there is user access to the database for selecting the booster pump for the circulating cooling water of the bypass piping system; and
  automatically monitoring the data updating and reminding the user to perform the data updating when it is monitored that there is data updating for the booster pump for the circulating cooling water of the bypass piping system selected by the user.

5. The method for selecting the booster pump for the circulating cooling water of the bypass piping system according to claim 1, wherein the performing the primary booster pump selection from the database for selecting the booster pump for the circulating cooling water of the bypass piping system according to the final user's selection requirements and constructing the booster pump preselection set comprises:
  presetting selection input options in selecting the booster pump for the circulating cooling water of the bypass piping system by the user, and performing primary quantization for determining user's selection requirements, the selection input options comprising a type, a desired flow, a desired head, desired efficiency, desired power, and desired performance of the booster pump for the circulating cooling water of the bypass piping system, and water resistance of the circulating cooling water of the bypass piping system;
  providing installation data graphs and size range options of the booster pump for the circulating cooling water of the bypass piping system that conform to the selection input options once the user completes the selection input options, and performing secondary quantization for determining user's selection requirements;
  determining the final user's selection requirements according to the user's selection requirements determined by the primary quantification and the user's selection requirements determined by the secondary quantification; and
  performing the primary booster pump selection from the database for selecting the booster pump for the circulating cooling water of the bypass piping system according to the final user's selection requirements, and constructing the booster pump preselection set.

6. The method for selecting the booster pump for the circulating cooling water of the bypass piping system according to claim 5, further comprising:
  performing a selection simulation test on the primary booster pump selection according to a preset test strategy and determining that the primary booster pump selection is capable of being performed in a case where efficiency for the primary booster pump selection and accuracy for the primary booster pump selection are monitored to meet a test standard; and
  adjusting and optimizing a selection range according to the efficiency for the primary type selection and the accuracy for the primary booster pump selection in a case where efficiency for the primary booster pump selection and accuracy for the primary booster pump selection are monitored to not meet the test standard; and
  wherein the preset test strategy comprises an automatic periodic cycle simulation test strategy and a manual random simulation test strategy.

7. The method for selecting the booster pump for the circulating cooling water of the bypass piping system according to claim 1, wherein the visually outputting and displaying the performance parameters, the performance curve and the installation data graph of the finally selected booster pump for the circulating cooling water of the bypass piping system comprises:
  acquiring the performance parameters of the finally selected booster pump for the circulating cooling water of the bypass piping system, determining a flow-head change curve and a flow-power change curve, performing curve fitting on the flow-head change curve and the flow-power change curve according to a preset curve processing strategy, and determining a performance curve of the finally selected booster pump for the circulating cooling water of the bypass piping system;

accessing an installation data graph database to determine the installation data map of the finally selected booster pump for the circulating cooling water of the bypass piping system;

acquiring a user data format once the user defines a data format, and calling the installation data map of the finally selected booster pump for the circulating cooling water of the bypass piping system and performing data format conversion; and visually outputting and displaying the performance parameters, the performance curve and the installation data graph.

8. The method for selecting the booster pump for the circulating cooling water of the bypass piping system according to claim 1, wherein the calculating the water resistance of the circulating cooling water in the bypass piping system for the respective booster pumps in the booster pump preselection set according to hydraulic calculation characteristics of the series connected piping comprises:

$$\begin{cases} H1 = (S1Q1^2 + H1 + H2) \cdot \lambda \dfrac{L1}{d1} \dfrac{v1^2}{2g} \\ H2 = \left(S1Q2^2 + H3 + \dfrac{L1}{n1} \sum_{i1=1}^{n1}\left(a1\dfrac{vi1}{di1}\right) + \sum_{i1=1}^{n1} Ri1\right) \cdot \lambda \dfrac{L1}{d1} \dfrac{v1^2}{2g} \end{cases};$$

in which H1 indicates water resistance of the circulating cooling water in the bypass piping system for the booster pump for the circulating cooling water of the bypass piping system in normal operation; H2 indicates water resistance of the circulating cooling water in the bypass piping system for the booster pump for the circulating cooling water of the bypass piping system in full-load operation; S1 indicates resistance of a bypass piping; Q1 indicates a normal-operation flow of the circulating cooling water in the bypass piping system in normal operation; H1 indicates water resistance from the secondary filter of the circulating cooling water in the bypass piping system in normal operation; H2 indicates water resistance from the condenser of the circulating cooling water in the bypass piping system in normal operation; λ indicates a frictional resistance coefficient of the circulating cooling water in the bypass piping system; L1 indicates a total pipeline length of the bypass piping system; d1 indicates an average pipeline diameter of the bypass pipe system; v1 indicates a flow rate of the circulating cooling water in the bypass piping system; g indicates an acceleration of gravity; Q2 indicates a full-load-operation flow of the circulating cooling water in the bypass piping system in full-load operation; H3 indicates water resistance from the secondary filter of the circulating cooling water in the bypass piping system in full-load operation; a1 indicates a correction coefficient of the circulating cooling water in the bypass piping system in full-load operation; vi1 indicates a full-load flow rate of the circulating cooling water in an i1-th section of pipeline in the bypass piping system;

di1 indicates a pipeline diameter of the i1-th section of pipeline in the bypass piping system; Ri1 indicates full-load water resistance of the circulating cooling water in the i1-th section of pipeline in the bypass piping system; n1 indicates a number of segments of pipelines in the bypass piping system.

* * * * *